July 6, 1954  J. F. SCHOCK  2,682,798
RECORDER SYSTEM
Filed Aug. 20, 1945  4 Sheets-Sheet 1

INVENTOR.
JOHN F. SCHOCK
BY
Virgil E. Woodcock
ATTORNEY

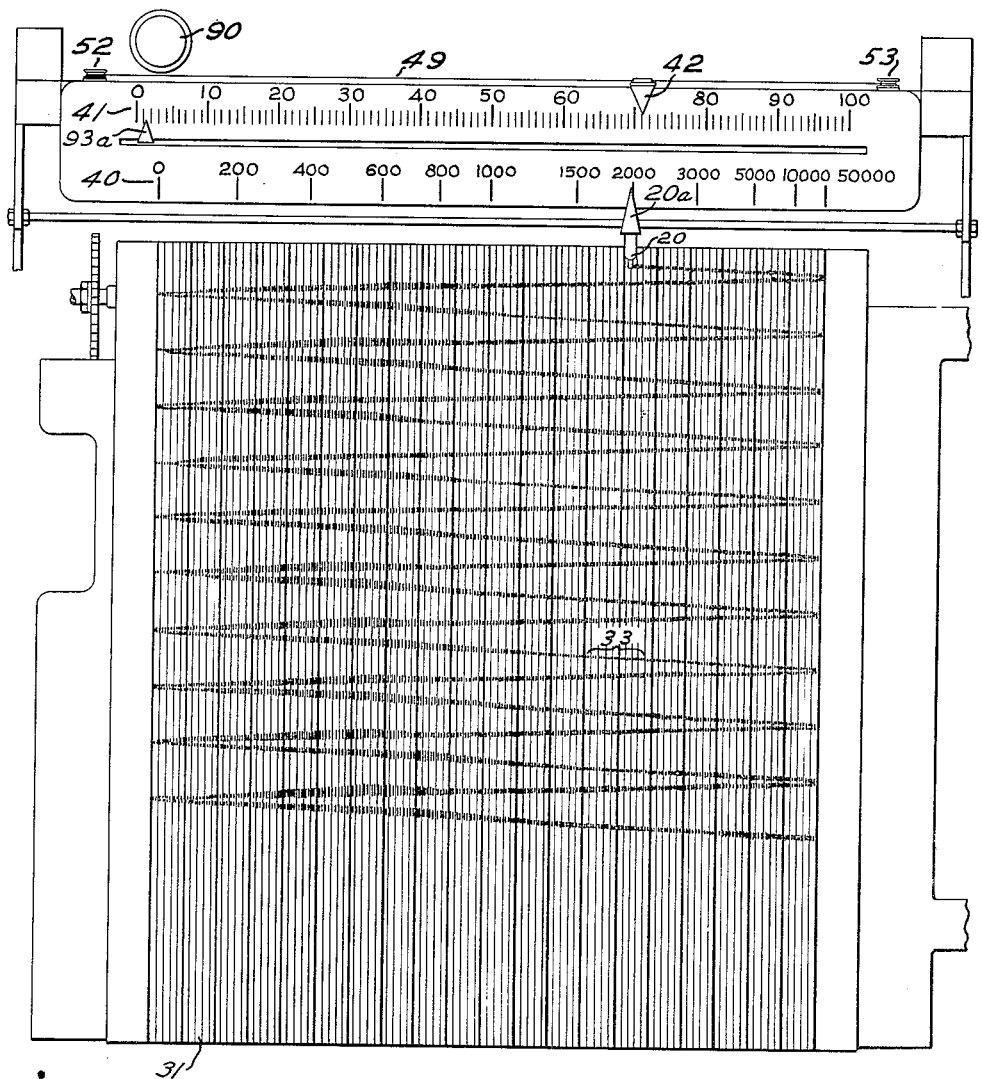
Fig.2.
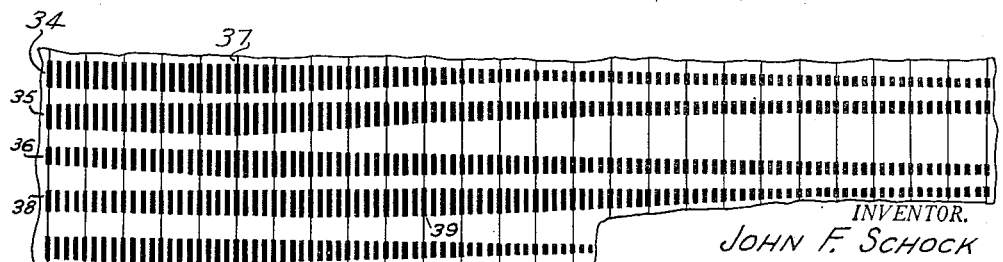
Fig.2-A.
INVENTOR.
JOHN F. SCHOCK
BY
Virgil E. Woodcock
ATTORNEY

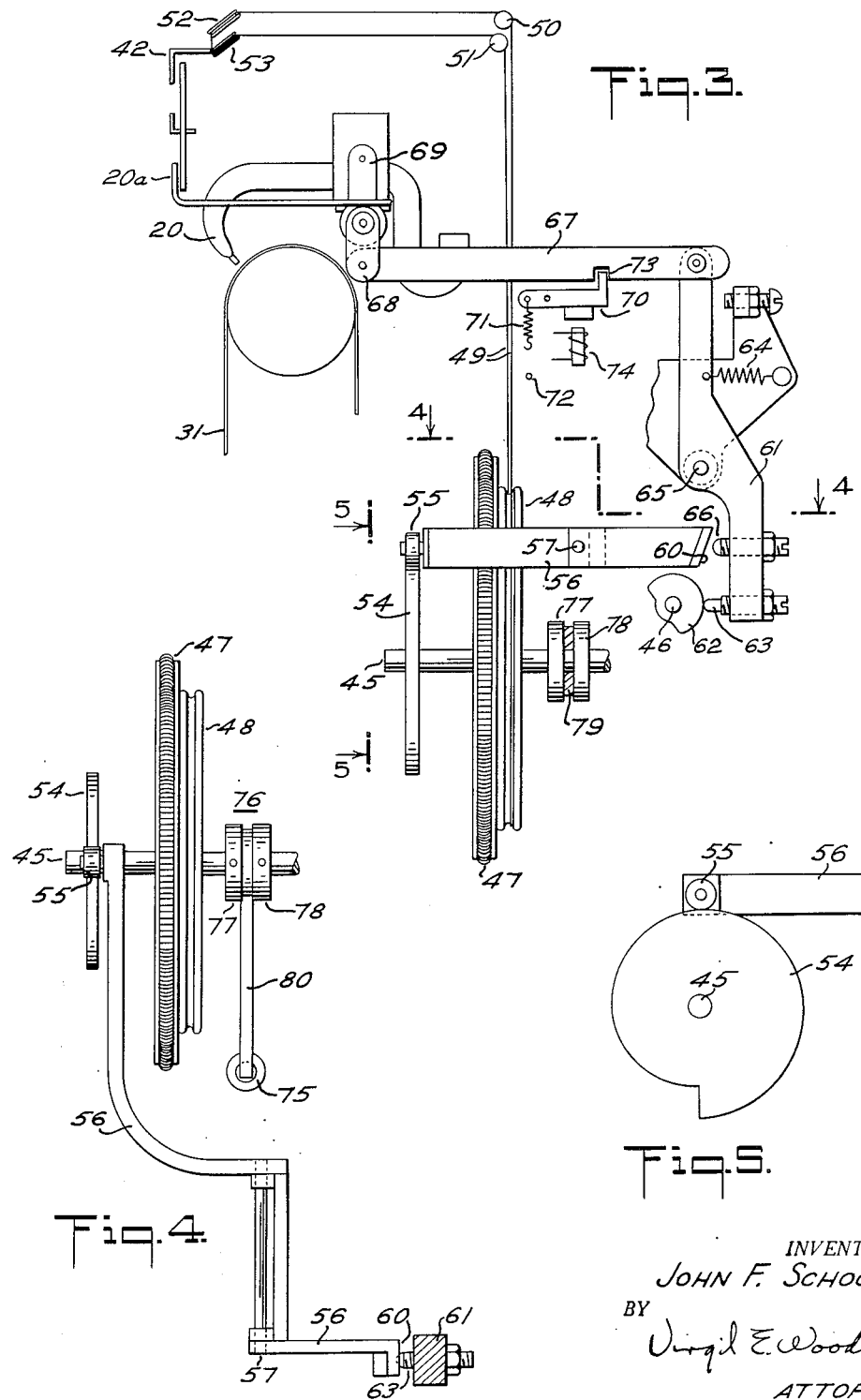

July 6, 1954     J. F. SCHOCK     2,682,798
RECORDER SYSTEM

Filed Aug. 20, 1945     4 Sheets-Sheet 4

INVENTOR.
JOHN F. SCHOCK
BY
Virgil E. Woodcock
ATTORNEY

Patented July 6, 1954

2,682,798

UNITED STATES PATENT OFFICE 2,682,798

RECORDER SYSTEM

John F. Schock, Philadelphia, Pa., assignor to Leeds and Northrup Company, Philadelphia, Pa., a corporation of Pennsylvania Application August 20, 1945, Serial No. 611,637

5 Claims. (Cl. 88—1)

This invention relates to recorder systems, more particularly to the provision of a system for the simultaneous recording of two variables with a single stylus. Though the invention is applicable for the recording of two variables wherever the need arises, it has been found that it is particularly useful in systems, for measurement of cloud heights, of the type described in "Electronic Industries," September 1943, at pages 90 et seq.

In carrying out the invention in one form thereof the transverse position of the stylus with respect to a chart is determined by one variable, while the second variable is utilized to move the stylus at an angle, the extent of angular movement being related to the then existing magnitude of the second variable.

For a more complete understanding of the invention and for further advantages thereof, reference should now be had to the following description taken in conjunction with the accompanying drawings, in which:

Fig. 1 diagrammatically illustrates the invention as applied to the measurement of cloud heights;

Fig. 2 is a front elevation of a recorder, embodying the invention, with the housing omitted;

Fig. 2A is an enlarged fractional view of a part of the record chart shown in Fig. 2;

Fig. 3 illustrates a part of the actuating mechanism of the recorder in Fig. 2;

Fig. 4 is a plan view taken on the line 4—4 of Fig. 3;

Fig. 5 is a front elevation, taken on the line 5—5 of Fig. 3, which illustrates a cam;

Figure 1:
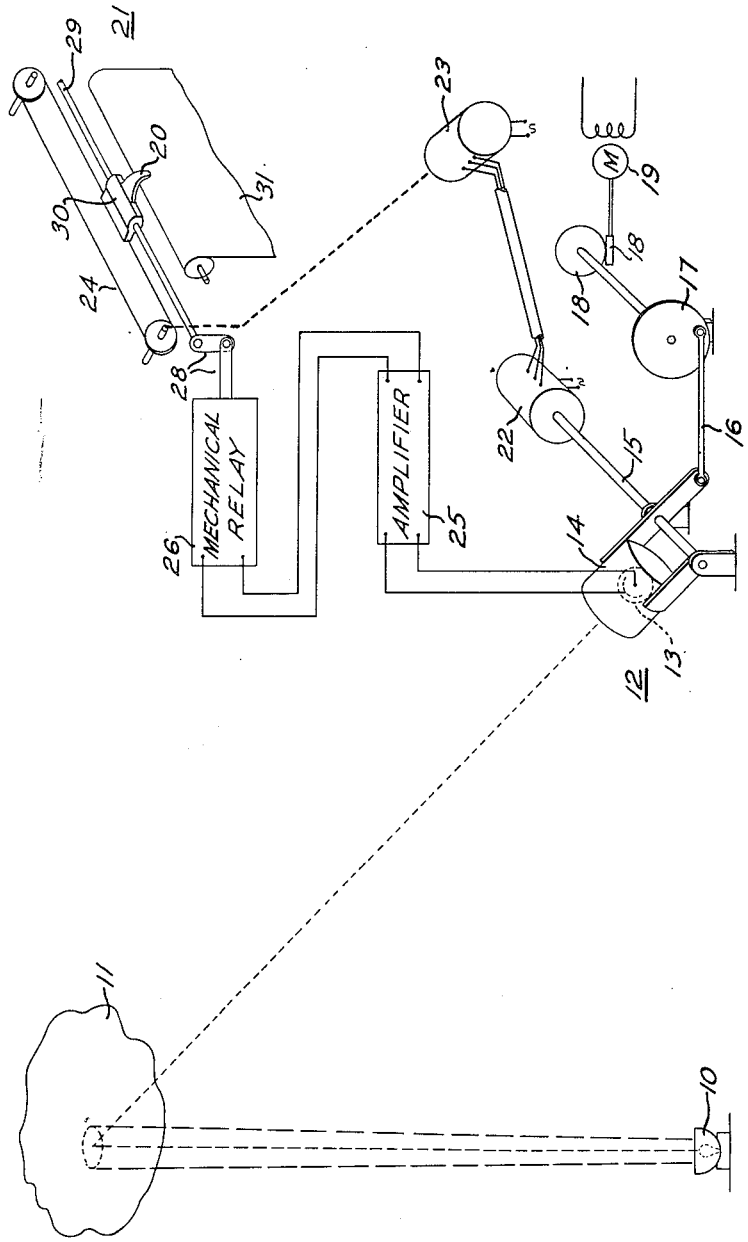

Referring to the drawings, the invention in one form has been applied to a ceilometer for the measurement of the height of clouds above a reference plane, usually the ground. This is accomplished by the vertical projection of a beam of radiant energy produced as by a mercury arc projector 10. The beam of light or radiated energy is diffusely reflected from clouds but directly above the projector, as on the cloud 11, will be a spot or area of maximum illumination. At a predetermined distance from the projector 10 there is located a detector or clinometer 12 comprising a photoelectric cell 13 carried in a housing 14 provided with suitable means, such as lenses or mirrors, for directing received radiation to the photoelectric cell 13. The housing 14 is carried by a shaft 15 and, by means of an arm 16 driven by a crank disc 17, is slowly oscillated back and forth through a 90° angle. The crank disc 17 is driven through speed reduction gearing 18 by a motor 19.

It will be readily apparent to those skilled in the art that the height of the cloud 11 may be determined directly from the angular position of the clinometer 12. Accordingly, a stylus or marker 20 of a recorder 21 is synchronously driven with the clinometer 12 by any suitable means, such for example, as a "Selsyn" transmitter 22 and a "Selsyn" receiver 23. The latter, as indicated by the broken line, drives a pulley which carries a violin string 24 to which the marker 20 is attached. The marker 20 is thereby driven transversely of the record sheet 31. The output from the photoelectric cell 13 is amplified by an amplifier 25. The output thereof is applied to an electromechanical converter 26 labeled in the drawing "Mechanical Relay." As now developed, the mechanical relay 26 preferably is of the type disclosed in U. S. Patents 1,935,732—Squibb and 2,113,748—Ross et al. The relay 26 is arranged to rotate through linkage 28 the rod 29 on which the pen carriage 30 slides in order to produce marks disposed at an angle to the record made by movement of the marker 20 along the rod 29.

With a system operating as above described, there is produced on the record sheet 31, Figs. 2 and 2A, a record which indicates not only the heights of clouds but also the intensity of the radiation received by the photoelectric cell 13. The mercury arc projector 10 in general will be supplied with alternating current having a frequency of 60 cycles per second. Accordingly, the light or radiant energy will be modulated at a frequency of 120 cycles per second. By means of suitable filtering circuits in the amplifier 25 only the 120-cycle current will be amplified. Accordingly, the output of the amplifier 25 will be limited solely to energy radiated from the projector 10 and received by the photoelectric cell 13.

In the absence of clouds, the marker 20, as shown in Fig. 2, will produce a series of dots, such as those embraced by the bracket 33. However, when clouds are present, each dot will be lengthened an amount proportional to the increased output of the photoelectric cell 13. As shown in Fig. 2, the recorder sheet 31 moves downwardly at a substantially constant speed. A typical record has been illustrated as starting at the lower right-hand side of the record sheet. At that time, the clinometer 12 would be disposed in the vertical position, ninety degrees from the position occupied when the marker 20 has been moved to the left-hand side of the record sheet. Theoretically, with the clinometer 12 in the vertical position, the height of the clouds in terms of the position of the clinometer would be of infinite height. As a practical matter, however, the scale has been graduated from 0 to 50,000 feet.

As the clinometer is moved from the vertical position towards its horizontal position the marker is moved from the right-hand side of the chart toward the left-hand side. Since the radiation from the projector 10 will be diffused by clouds, the amount of radiation received by the clinometer 12 will vary. As the clinometer views, or is directed towards, the fringe of a cloud, only a small part of the radiant energy from the projector 10 will be reflected to, and received by the clinometer 12. If the cloud is of the same density and color throughout, the radiations received by the clinometer 12 will gradually increase until the clinometer "sees" or is directed toward the area vertically above the projector 10, as shown in Fig. 1. Thereafter, as it moves away from that area, the intensity of the radiation received by the clinometer 12 will decrease. Thus, referring to the lowermost record on the chart 31, Fig. 2, a cloud has produced a record showing its height to be approximately 700 feet.

As best shown in Fig. 2-A, the maximum height of the clouds which produced the records 34, 35 and 36 appears along the vertical line 37 of the chart. In the record 38 the maximum height occurs at the vertical line 39.

As already stated, the angular position of the clinometer 12 may be directly translated into height. Accordingly, a scale 40 is provided, calibrated from 0 to 50,000 feet. The marker or pen 20 has a pointer 20a which cooperates with the scale 40. A second scale 41 ranging from 0 to 100 has a pointer 42 arranged to indicate signal strength which will correspond with the length of each of the vertical records drawn on the chart by the pen 20.

Before referring to Fig. 3, reference should be had to said Squibb Patent 1,935,732 and to said Ross et al. Patent 2,113,748, for a complete description of the preferred form of mechanical relay and recording apparatus. That relay and apparatus has been modified in accordance with the present invention. With an understanding of the apparatus disclosed by said patents, the manner in which it has been modified in accordance with the present invention may be readily understood. In Fig. 3, the shaft 45 corresponds with the shaft 36 of said Ross et al. patent, while the shaft 46 of Fig. 3 corresponds with the shaft 30 of said Ross et al. patent. The shaft 45 is driven by a galvanometer-controlled clutch mechanism (shown in said patents) and modifies the position of slidewire 47 in accordance with deflection of the galvanometer. The slidewire 47 is connected in a potentiometer circuit of the type disclosed in Fig. 2 of said Ross et al. patent. The output from the amplifier 25 after demodulation is applied to a resistor connected in place of the thermocouples 56 of said Fig. 2. Thus, the slidewire 47 will at all times occupy a position related to the strength of the signal applied to the potentiometer network. Also secured to the shaft 45 is a driving pulley 48 around which is looped a violin string 49. The violin string extends over idler pulleys 50—53. The pointer 42 is secured to and is driven by the violin string 49.

As the slidewire 47 is rotated, to position the pointer 42 in accordance with the intensity of the radiation received by the clinometer 12, a cam 54 carried by the shaft 45 is also rotated. It positions a cam follower 55 carried by a lever 56 pivoted at 57. The lever 56 carries a cam surface 60 for controlling the operation of a marker-actuating lever 61. Though the lever 56 may have any desired shape, the construction shown in Fig. 4 is preferred for application to the mechanism disclosed in said Squibb and Ross et al. patents.

The shaft 46 is rotated continuously. It carries a cam 62 on which there rides a cam follower 63 carried by the lever 61. This lever is biased by a spring 64 for rotation in a clockwise direction about its pivot pin 65. The cam 62 synchronizes the operation of the pen 20 with the galvanometer-controlled clutch mechanism; i. e., it permits a printing operation to occur only when the shaft 45 is stationary. When this occurs the cam 62 will be in a position to free the cam follower 63. The spring 64 thereupon rotates the arm 61 until a cam follower 66 engages the cam surface 60. Rotation of the lever 61 is transmitted by a link 67 to an arm 68, which is effective to move the pen carriage 69 in a plane parallel to the plane of Fig. 3. The pen 20 is itself pivotally mounted in the pen carriage so that after the stylus engages the chart 31 further movement of the pen along the chart will occur upon further movement of the carriage 69. The extent of movement of the pen 20 along the chart is controlled by the position of cam surface 60 with respect to the cam follower 66. When the output from the photoelectric cell 13 is a minimum, the mechanical relay will position the slidewire 47 and the cam 54 so that the cam surface 60 will be moved to a position for minimum movement of the cam follower 66. As shown in Fig. 2, that movement will be substantially zero. Therefore, the pen 20 will make dots on the record sheet 31, as shown at 33. As the signal strength increases, the pen 20 will draw lines whose lengths are related to the magnitudes of the signals. These lines are at an angle to the transverse movement of the pen 20 as produced by the "Selsyn" receiver 23. Thus, the pen movements between minima and maxima record the strength of the signal from the clinometer 12 for different cloud heights. The result is a record, Fig. 2, which forms a pattern from which may be readily determined the heights of cloud formations in the sky.

In the foregoing embodiment of the invention the pen 20 places a mark on the record sheet 31 for each cycle of operation of the mechanical relay 26, normally one every two seconds. Thus, with the clinometer 12 operated at a speed which requires six minutes for it to cover its ninety-degree scanning angle, some 180 marks may be placed upon the record sheet for each movement of the pen from one side of the chart to the other.

It will be recalled that the radiation received by the clinometer 12 from a cloud normally increases to a maximum and then decreases. In case it is desired to place a mark upon the chart only at the approximate time of maximum intensity of the signal, a latch 70 may be rendered effective by attaching its spring 71 to a pin 72. The latch 70, then biased into a notch 73 provided in the link 67, will prevent movement thereof until withdrawal of the latch by an electromagnet 74. The electromagnet 74 is under the control of switch 75 operated by the shaft 45 through a slip clutch 76. As best shown in Figs.

3 and 4, the clutch consists of two discs 77 and 78 secured to the shaft 45 and embracing a disc 79, from which there extends a switch operating member 80. So long as the signal from the clinometer 12 is increasing the shaft 45 will be rotating in a direction to maintain the contacts of the switch 75 in the open position. However, when the signal begins to decrease, the shaft 45 is rotated in the opposite direction. Immediately, the slip clutch 76 moves the switch arm 80 to close the contacts of the switch 75. Thereupon the electromagnet 74 is energized to withdraw the latch 73 to permit a printing operation in manner already described.

Figure 6:
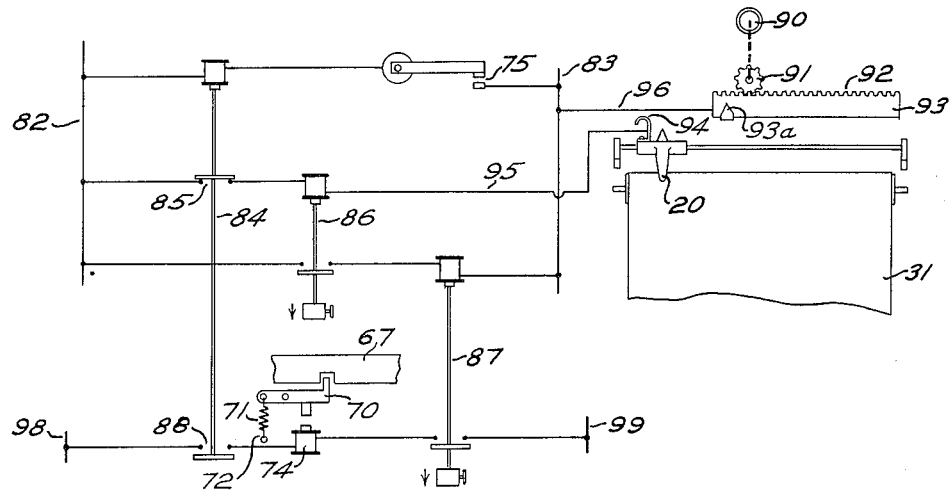
Fig. 6 is a wiring diagram of a modified form of the system, applicable to the mechanism of Fig. 3.

Referring to Fig. 6, a wiring diagram has been illustrated for the control of the electromagnet 74. The supply lines 82 and 83 will be assumed to be energized from a low voltage direct current source.

A relay 84 is shown in the deenergized position with its contacts 85 closed and its contacts 88 open. A timing relay 86 is provided to introduce a time delay for the opening of its contacts, as indicated by the dashpot and the downwardly directed arrow. A second timing relay 87 is provided for additional time delay upon deenergization thereof. The electromagnet 74 is under the control of the contacts 88 of the relay 84 and the contacts of the time delay relay 87.

When the clinometer 12 is in its lower positions, i. e., when its angle above the horizon is small, light or radiation from undesired sources sometimes interferes with operation. To eliminate such spurious signals, a threshold setter is provided so that the clinometer will only respond to signals received when the clinometer forms with the horizon an angle above a predetermined size or magnitude. The threshold setter is operated by a knob 90, Figs. 2 and 6, which rotates a gear 91, meshing with gear teeth 92 carried by, or formed in, a slidable bar 93. The bar 93 is preferably located above the pen 20. It carries a pointer 93a which, Fig. 2, cooperates with the scale 41. A contact 94 supported from the pen carriage 69, Figs. 3 and 6, is arranged to complete a circuit upon movement into engagement with the bar 93. Thus, as the pen 20 is moved to the right, as viewed in Fig. 6, the contact 94 will engage the bar 93 to complete an energizing circuit for the timing relay 86. This circuit may be traced from the supply line 82 by way of contacts 85, the operating coil of relay 86, conductor 95, contact 94, the bar 93 and by conductor 96 to the other supply line 83. The relay 86 thereupon closes its contacts to energize the timing relay 87 which closes its contacts. By rotating the knob 90 the bar 93 may be set in any desired position. When moved to the extreme left, as viewed in Fig. 6, the circuit through the contact 94 and the bar 93 will be completed during the entire movement of the pen 20 and of the clinometer 12. With the relays 86 and 87 energized, the electromagnet 74 will be energized as soon as relay 84 is energized by closure of anticipator switch 75. It will be remembered that this switch will close whenever the voltage or signal output from the clinometer reaches a peak and starts to diminish therefrom.

It will now be assumed that this condition has been fulfilled and that the anticipator switch 75 has been operated to its closed position. The operating coil of the relay 84 will then be energized to open its contacts 85 and close its contacts 88 to complete the energizing circuit for the electro-magnet 74. As shown, this circuit is completed from separate supply lines 98 and 99. They may be connected to a suitable alternating current source or to a direct current source. Upon completion of the aforesaid circuit, the electro-magnet 74 moves the latch 70 out of engagement with the link 67. The recorder may then be operated to place a record on the chart. The location of the record will be indicative of the angle of the clinometer and of the height of the cloud. The length of the line on the chart, under the control of the cam 60, will be indicative of the strength of the signal.

It will be remembered that upon energization of the relay 84 the circuit through the contacts 85 was interrupted. However, the relay 86 does not immediately open the circuit for the coil of relay 87. After a suitable time delay, of the order of a quarter of a second, the relay 86 moves to the deenergized position. After another delay of around a quarter of a second, the relay 87 moves to its deenergized position to interrupt the energizing circuit for the electromagnet 74. The latch 70 is then operated by the spring 71 again to lock the link 67. Though one timing relay may be utilized instead of the two illustrated, additional flexibility is secured by providing both relays since both may be adjusted to provide any desired time delay. Also, relays having short-circuited windings may be used to provide the required time delay. The time delay is provided to prevent a second printing or marking operation until the anticipator switch 75 has been opened and again closed. As shown, the timing relays 86 and 87 will not be energized until the contacts 85 again close, upon deenergization of relay 84 by the opening of switch 75.

Figure 7:
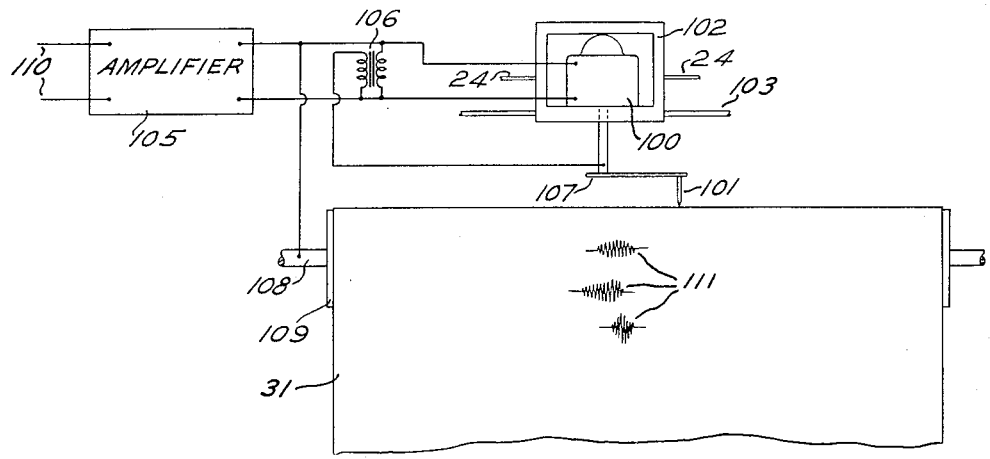
Fig. 7 diagrammatically illustrates another modified form of the invention.

In the form of the invention illustrated in Figs. 1–6, the length of each line or mark placed upon the record sheet is determined by the extent of relative movement of the pen 20 with respect thereto. Instead of utilizing the relative pivotal movement between the pen 20 and its carriage 69 to place a mark of predetermined length on the chart, the arrangement of Fig. 7 may be utilized. As shown, an actuator 100 for a stylus 101 is carried by a frame 102, itself slidably mounted on one or more rods 103. The actuator 100 may be a direct current motor, or it may be an electrodynamometer of a character which will move the stylus 101 with respect to the chart 31 by an amount related to the strength of the signals from an amplifier 105. In order to produce a mark on the chart 31 the output voltage from the amplifier is increased by means of a step-up transformer 106, one lead of which extends to the arm 107 which supports the stylus and the other lead of which extends to the shaft 108 and the roller 109 which supports the chart or record sheet 31. The record sheet 31, in accordance with this form of the invention, comprises a voltage or current-sensitive paper of the type known to the art under the trade name of "Teledeltos." Such a paper has the characteristic of yielding a distinctive mark when current passes through it, as from the stylus 101 to the conducting roller 109. To provide a flat marking surface, a flat guide plate, not shown, extending rearwardly of the roller 109 may be provided beneath the record sheet 31 and the stylus 101.

As described in connection with Fig. 1, the carriage 102 has secured to it the violin string 24 by means of which the "Selsyn" receiver 23 moves the carriage 102 across the chart as the clinometer 12 is moved between its horizontal and vertical positions. The output of the clinometer is connected directly to the input circuit 110 of the amplifier 105. When the clinometer 12 "sees" a cloud, the radiation received therefrom produces output signals which after amplification move the stylus 101 to produce angular marks 111 on the record sheet 31 whose lengths are representatives of the magnitudes of the received radiation.

While preferred forms of the invention have been disclosed, it is to be understood that further modifications may be made without departing from the spirit and scope of the invention as set forth in the appended claims.

What is claimed is:

1. In a system of measuring cloud heights having a clinometer movable through a given scanning angle for translation of received signals into cloud heights, a recorder having a stylus, and means for driving a record sheet, the improvement which comprises means operable under the control of said clinometer for moving said stylus from one limit to another limit as said clinometer is moved through its scanning angle, releasable means for holding said stylus out of engagement with the record sheet, and means operable only upon decrease in the signal output from said clinometer for actuating said releasable means to release said stylus to produce a mark on the record sheet.

2. In a system of measuring cloud heights having a clinometer movable through a given scanning angle for translation of received signals into cloud heights, a recorder having a stylus, and means for driving a record sheet, the improvement which comprises means operable under the control of said clinometer for moving said stylus from one limit to another limit as said clinometer is moved through its scanning angle, releasable means for holding said stylus out of engagement with the record sheet, means operable whenever the signal output from said clinometer changes from an increasing output to a decreasing output for actuating said releasable means to release said stylus to produce on the record sheet a mark of magnitude related to the magnitude of said output.

3. In a distance-measuring system including a transmitter and a receiver relatively and cyclically angularly movable with respect to each other for producing a signal representative of the distance of an object, the strength of said signal being dependent upon the character of said object and other factors, the combination of a recorder provided with a record sheet movable in a predetermined direction, a stylus mounted for movement between predetermined limits of said sheet, means for cyclically driving said stylus between said limits in timed relation with said angular movement between said transmitter and said receiver so that the position of said stylus is at all times related to the angular position between said transmitter and said receiver, and structure including means responsive to a signal of varying intensity normally holding said stylus out of engagement with said chart and for actuating said stylus to produce a mark on said chart only when there occurs a reversal in the rate of change of the intensity of said signal, and means for regulating the extent of movement of said stylus to produce a mark whose length is related to the magnitude of said signal.

4. In a recorder having a stylus, a carriage for supporting said stylus, elongated supports for said carriage for establishing a predetermined path of movement, an actuating arm for rotating said elongated supporting member for rotating said carriage about an axis extending parallel to said predetermined path, means for driving a record sheet in a direction transverse of the path of movement of said stylus, said stylus being movable into and out of engagement with said record sheet upon rotation of said supporting member, relative movement of said stylus along the chart in directions normal to said path occurring upon rotation of said supporting member beyond the position where said stylus first engages the chart, the combination of a cam for maintaining said actuating member in a position to hold said stylus in spaced relation with the record sheet and for cyclically releasing said actuating member for movement of said stylus toward the record sheet, means for regulating the extent of movement of said stylus toward said record sheet comprising an element having an adjustable angularly disposed cam surface which in different positions will arrest movement of said actuating member in different angular positions to vary between minima and maxima the extent of movement of said stylus along said record sheet, and means responsive to the magnitude of a condition for adjusting the position of said angularly disposed cam surface for movement of said stylus while engaging the record sheet by an amount related to the magnitude of said condition.

5. The combination set forth in claim 4 in which there is provided structure including a second means for holding said stylus out of engagement with said chart and means responsive to a reversal in the rate of change of the magnitude of said condition for actuating said second means to release said stylus for production of a mark upon the chart having a length related to the magnitude of said condition attained upon said reversal in said rate of change thereof.

References Cited in the file of this patent

UNITED STATES PATENTS

| Number | Name | Date |
|---|---|---|
| 1,613,520 | Marti | Jan. 4, 1927 |
| 1,687,555 | Gasiorowski | Oct. 16, 1928 |
| 1,850,909 | Bahney | Mar. 22, 1932 |
| 1,873,126 | Hugershoff | Aug. 23, 1932 |
| 1,935,732 | Squibb | Nov. 21, 1933 |
| 2,113,748 | Ross et al. | Apr. 12, 1938 |
| 2,351,081 | Swift | June 13, 1944 |
| 2,365,580 | Muncek | Dec. 19, 1944 |
| 2,504,126 | Howe | Apr. 18, 1950 |

FOREIGN PATENTS

| Number | Country | Date |
|---|---|---|
| 193,841 | Great Britain | Mar. 27, 1924 |
| 329,403 | Great Britain | May 22, 1930 |

OTHER REFERENCES

"Measuring Cloud Heights," Sept. 1943, page 90 et seq.

"Tubes Measure Cloud Ceilings for Pilots," Dec. 1944, page 194.